United States Patent

Tateisi et al.

[15] 3,648,020
[45] Mar. 7, 1972

[54] AUTOMATIC DEPOSIT-RECEIVING AND CASH-DISPENSING SYSTEM

[72] Inventors: Kazuma Tateisi; Yukio Mizuta; Shizuya Ano, all of Kyoto, Japan

[73] Assignee: Omron Tateisi Electronics Co., Kyoto, Japan

[22] Filed: Apr. 15, 1970

[21] Appl. No.: 28,635

[30] Foreign Application Priority Data

Apr. 26, 1969 Japan..................................44/32572

[52] U.S. Cl.......................................235/61.7 B, 340/149 A
[51] Int. Cl..........................................................G06k 7/01
[58] Field of Search.......................340/149; 235/61.7, 61.11

[56] References Cited

UNITED STATES PATENTS

| | | | |
|---|---|---|---|
| 3,039,582 | 9/1962 | Simjian | 235/61.7 B |
| 3,221,304 | 11/1965 | Enikeieff et al. | 235/61.7 B |
| 3,308,238 | 3/1967 | Brothman et al. | 340/149 A |

*Primary Examiner*—Daryl W. Cook
*Assistant Examiner*—William W. Cochran
*Attorney*—Christensen, Sanborn and Matthews

[57] ABSTRACT

An automatic deposit-receiving and cash-dispensing system for use in banks and the like, which contemplates the use of a customer's identification card issued by the bank to each of its customers, and comprises an automatic deposit-receiving and cash-dispensing machine, a data-transmitting system and an electronic computer which stores data concerning the balances of the accounts of the customers. When a customer uses his card in the machine for making a deposit or withdrawal, the validity of the card is checked and the account number, the amount of money to be deposited or withdrawn and other data are sent to the computer. On the basis of these data the computer rewrites the balance of the customer's account and sends necessary data back to the machine, which operates to accept the deposit from, or dispense the required amount of cash to, the customer.

4 Claims, 4 Drawing Figures

Patented March 7, 1972 3,648,020

INVENTORS
KAZUMA TATEISI
BY YUKIO MIZUTA
SHIZUYA ANO
Christensen, Sanborn, Matthews
ATTORNEYS

AUTOMATIC DEPOSIT-RECEIVING AND CASH-DISPENSING SYSTEM

This invention relates to a system for automatically receiving deposits and dispensing cash for use in banks and similar facilities.

In most banks and the like, a teller manually receives a deposit from, or hands cash to, a customer. If such banking services can automatically be conducted without the intervention of a teller or any other bank employee, it will be very convenient to customers since they can make a deposit or withdrawal during the hours when banks are closed. Recent years have seen a tendency that banks become more and more equipped for automation of banking business. For example, there are facilities for a customer to withdraw cash by using a card or the like without requiring any services of a bank teller. The use of such cards, however, has hitherto been limited to making a withdrawal alone, and to the best knowledge of the present inventors there is no system available wherein one and the same card can be commonly used to make both deposits and withdrawals.

Accordingly, it is one object of the invention to provide an automatic deposit-receiving and cash-dispensing system for use in banks and other similar establishments.

Another object of the invention is to provide such a system as aforesaid, wherein a customer can use one and the same card commonly for making a deposit and a withdrawal.

Another object of the invention is to provide such a system as aforesaid which works selectively as an online and an off-line system and in the latter case the balance of each customer's account can be confirmed and rewritten at real time.

Still another object of the invention is to provide such a system as aforesaid, wherein the information recorded on the card used for making a deposit or withdrawal as an embossed portion thereof is imprinted on a slip, on which other necessary information resulting from the transaction is also printed, so that the slip may be used to serve as a record of the banking transaction.

A further object of the invention is to provide such a system as aforesaid, wherein the slip is prepared in duplicate so that one copy can be used to serve as a memo for the customer to know the present balance of his account, the number of times the card can yet be used, and other information.

The system of the invention contemplates the use of an identification card issued by the bank to each of its customers, and employs an automatic deposit-receiving and cash-dispensing machine, a data-transmitting system and an electronic computer. The automatic deposit-receiving and cash-dispensing machine is used as a local machine of the computer. The computer stores data concerning the balances of the accounts of all the customers of the bank that are permitted to use the system.

When a customer inserts his card into the machine, the validity of the card is checked and the account number, the amount of money to be deposited or withdrawn and other necessary data are transmitted to the computer. On the basis of these data, the computer operates to rewrite the balance of the customer's account and send necessary information back to the machine, which operates to accept the deposit from, or dispense the required amount of cash to, the customer. At the same time, the machine issues to the customer a slip on which the new balance, the number of times the card can yet be duly used, and other necessary information are printed.

The invention will be better understood from the following detailed description of one preferred embodiment thereof with reference to the accompanying drawings, wherein.

Figure 2:
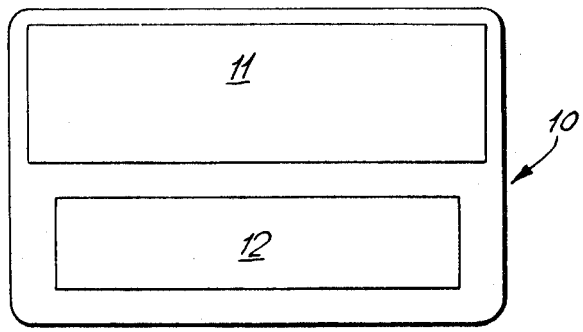
FIG. 2 shows the obverse of a card used in the system.
Figure 3:
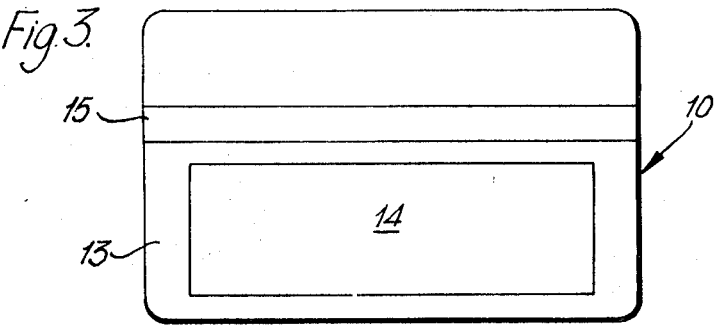
FIG. 3 is the reverse of the card of FIG. 2.
Figure 4:
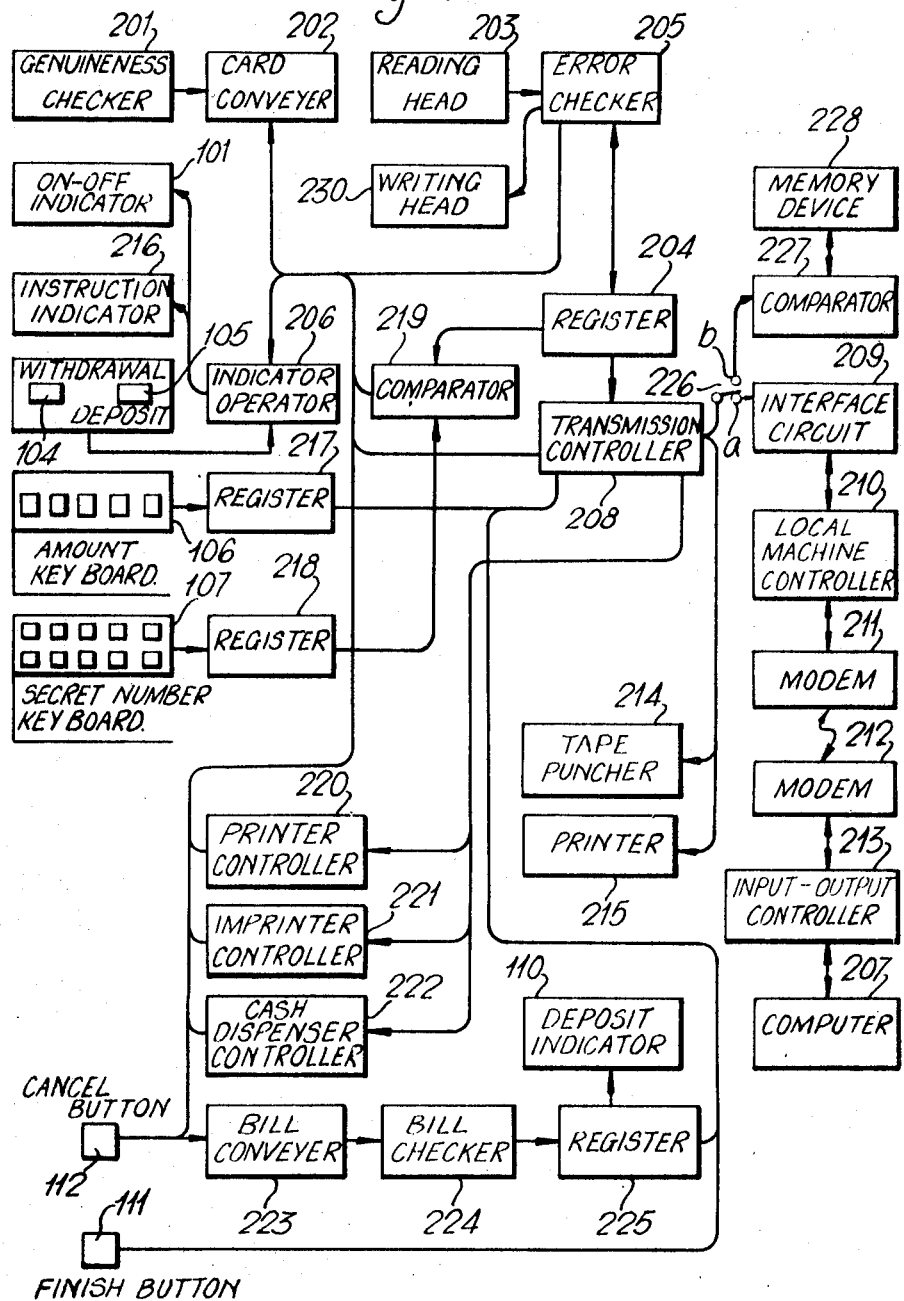
FIG. 4 is an electrical block diagram of the whole system of the invention.

A card 10 as shown in FIGS. 2 and 3 is previously issued to each of the customers of the bank who are permitted to use the system for making deposits and withdrawals. The card contains an information or data required commonly for both deposit and withdrawal, an information for deposit only and an information for withdrawal only. These kinds of information are recorded in different areas of the card. For example, as shown in FIG. 2, on its obverse the card 10 carries the name of the bank that issued the card in an area 11, and the term of its availability, the names of the banks where the card can be used, and the account number of the proper owner of the card in an area 12. These data are visibly printed or embossed on the card. On the reverse side 13 of the card, the signature of the owner of the card is written in an area 14 in such a manner that it cannot be easily erased. These are the common information.

The information for deposit and the information for withdrawal are written in an area 15 of the reverse side 13 of the card. The information for withdrawal may include a secret number known to the owner of the card and the number of times the card can yet be duly used for withdrawal; and the information for deposit may include the number of times the card has been used for deposit and the balance of the account of the card owner. These data are invisibly recorded by any suitable method, say, magnetic recording and can be read by a magnetic reader. The recording of the number of times the card can be used is for the purpose of limiting the amount of money that can be withdrawn per day. This number and the balance are rewritten every time the card has been used. These two kinds of data need not be recorded on the card if the system is operating as an online system. In the illustrated embodiment, however, since the system can operate as an online and alternatively an off-line system, the card advantageously contains these latter two kinds of data, from which it is possible to know whether the card is being duly used within the number of times permitted and also to prepare a slip.

The common information may preferably be embossed on the card so that it can be imprinted on the slip to serve as an evidence of the use of the card.

The secret number is previously known to the owner of the card when it is issued. When the customer uses his card, he enters the secret number into the system by means of a manual input device. If a predetermined relation exists between the secret number thus entered and the number read from the inserted card, the user of the card is recognized as its proper owner. The arrangement helps prevent fraudulent use of the card by an improper holder.

Figure 1:
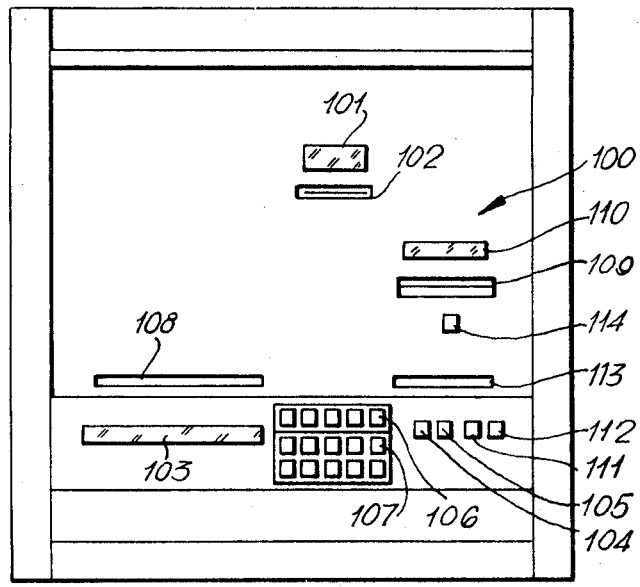
FIG. 1 is a front elevational view of an automatic deposit-receiving and cash-dispensing machine used in the system of the invention.

Referring now to FIG. 1, there is shown an automatic deposit-receiving and cash-dispensing machine (which will be referred to simply as the "machine" hereinafter) having a front panel 100, in which there are formed an indicating window 101 in the upper portion and an inlet slot 102 below the window. When the machine is operating, an indication "OPERATING" appears in the window 101, whereas when the machine is off, the indication is "NOT OPERATING." In the latter case, the inlet slot 102 is closed by a shutter, not shown, so as to prevent insertion of any card into the slot.

When the machine is in operation, the card can be inserted into the slot 102 with its predetermined one edge forward. If the card is inserted otherwise, that is, with any other edge forward, the slot 102 is also closed. Each card is provided at a predetermined position thereof with an invisible element by which to check the genuineness of the card, so that when a genuineness checker 201 detects the element, the slot 102 is kept open, whereas when the checker 201 has not detected any such element, the slot 102 is closed by the shutter. This arrangement also helps prevent false cards from being used in the machine.

When the card is genuine and has been inserted in the predetermined proper manner, a card conveyor 202, such as a belt-and-roller mechanism draws in the card and conveys it onto a card reader having a magnetic reading head 203, which reads the coded information in the area 15 on the card 10. The information read is stored in a register 204.

The information code on the card includes check bits, which are checked by an error checker 205. For the checking, the parity check or total check method may selectively be employed. If any error has been detected, the card 10 is returned by the conveyor 202 to the inlet slot 102, with an indication "THIS CARD CANNOT BE USED." appearing in another indicating window 103 provided on the front panel 100 of the machine. As will be described hereinafter, various indications or signs appear in the window 103. An instruction indicator 216 such as a rotary mechanism adapted to be operated by an operating circuit 206 may be employed to cause a required one of the signs to appear in the window 103.

In response to a polling signal from the computer 207, the common information read from the card and stored in the register 204 is transmitted by the transmission controller 208 to the computer through an interface circuit 209, a local machine controller 210, a MODEM 211, a MODEM 212 and an input-output controller 213. Upon receipt of the card information, the computer 207 checks whether the account number of the card used is valid, whether the term of its availability has expired, and whether the number of times the card has been used has reached the predetermined allowed number of times. If any one of these requirements is not met, the computer sends a corresponding signal to the machine to operate the indicator operating circuit 206 so that an indication "THIS CARD IS NOT RETURNED SINCE IT IS INVALID.," or "THIS CARD IS NOT RETURNED SINCE IT HAS ALREADY BEEN USED THE PERMITTED NUMBER OF TIMES." appears in the window 103 of the machine.

When the account number of the inserted card has been recognized as a valid one, the computer 207 causes the indicator operator 206 to operate the instruction indicator 216 so that the instructions for the step-by-step operation of the machine to be followed by the user successively appear in the window 103. For the first step to be taken, an indication "PUSH EITHER DEPOSIT OR WITHDRAWAL BUTTON." appears in the window 103.

On the front panel of the machine there are provided five pushbuttons 104, 105, 111, 112 and 114 and two keyboards 106 and 107 having a plurality of manually depressible buttons. The buttons 104 and 105 are for withdrawal and deposit, respectively, while the other buttons will be referred to later. Suppose that following the instructions for the first step indicated in the window 103, the customer have now pushed the withdrawal button 104. Then, the instruction indicator 216 causes an indication "ENTER THE AMOUNT YOU WISH TO WITHDRAW." to appear in the window 103. The customer enters the amount he wishes to withdraw into the system by means of the keyboard 106, and the amount entered is stored in a register 217. Then, in the window 103 there appears an indication "ENTER YOUR SECRET NUMBER." In response to this indication, the customer inputs his secret number through the other keyboard 107. The input secret number is stored in a register 218, and is compared with the account number read from the inserted card. To this end, the computer 207 may previously store the secret numbers corresponding to the account numbers of all the customers, so that the secret number entered by the customer is transmitted to the computer for comparison with the corresponding account number stored therein. This arrangement is suitable for use in an online system. In the illustrated embodiment, however, a comparator 219 is provided to compare the secret number stored in the register 218 and the account number stored in the register 204. This latter arrangement is suitable for use in the system of the invention which works selectively as an online and an off-line system. The comparison is initiated upon depression of the last button on the keyboard 107.

If there is no agreement between the two compared numbers, an indication "YOUR SECRET NUMBER IS INCORRECT. ENTER IT AGAIN." appears in the window 103. If, after repeated, say, three entries of the secret number, no agreement has been reached between the two compared numbers, the inserted card is collected into the machine, with an indication "YOUR CARD IS COLLECTED SINCE YOUR SECRET NUMBER IS INCORRECT.," and the result of the comparison is recorded by the tape puncher 214 and/or the printer 215.

If an agreement is found to exist between the two numbers upon comparison, the machine transmits the necessary data to the computer 207, which checks the balance of the customer in comparison with the required amount to be withdrawn. If the balance remains in favor of the customer despite the withdrawal, it is rewritten accordingly. However, if the balance is short of the amount to be withdrawn, the customer is so informed by indication in the window 103 and the card is returned through a return slot 108.

When the balance of the customer's account has thus been rewritten, a completion signal is sent to the machine to operate a printer controller 220 and imprinter controller 221 so that the embossed data on the card is imprinted on a slip, on which other necessary data such as the date of withdrawal, the amount withdrawn, the balance of the customer's account, etc., are also printed. The slip is preferably prepared in duplicate so that one copy is retained by the bank while the other is dispensed to the customer together with cash and the card as will be described hereinafter.

Before returning the card, a writing head 230 rewrites on the card the balance and the number of times the card can be used.

The operations of the imprinter and printer are mechanically checked so that if any erroneous operation has occurred, the machine is stopped with the card being retained therein and an indication "THE MACHINE IS IN DISORDER. CALL OPERATOR." appearing in the window. To call the operator, a button 114 may be pressed.

In parallel with the operations of the printer controller 220 and the imprinter controller 221, a cash dispenser controller 222 also operates so that a suitable device, such as a suction device (not shown) sucks a required number of bills and places them at a suitable position temporarily for checking the number of the bills, and the bills as well as the card and a copy of the slip are conveyed onto the return slot 108, with an indication "OPEN SHUTTER OF RETURN SLOT FOR YOUR CASH, CARD AND SLIP." appearing in the window 103. As instructed, the customer opens the shutter and takes out the bills, card and slip from inside the slot 108, whereupon the system is restored to the original condition.

If, after entering the secret number, the customer must wait a considerable period of time before dispensation of cash, an indication "A MOMENT PLEASE." may appear in the window 103, with some soft music being played to ease the waiting customer of any anxiety or irritation.

To make a deposit, the customer presses the deposit button 105 on the front panel of the machine, whereupon an indication "ENTER YOUR DEPOSIT AND WHEN YOU HAVE FINISHED, PRESS FINISH BUTTON." appears in the window 103. The customer then puts his bills (and/or coins) one by one through an inlet slot 109, and the bills are conveyed by a conveyor 223 to a bill (and/or coin) checker 224, which checks the genuineness of the introduced bills and sums up their values. The total amount is stored in a register 225 and at the same time indicated by means of an indicator 110 for the customer to know the value he has just introduced into the slot 109. If any of the bills introduced is false, it is sent back to the slot 109. When all the bills have been introduced, the customer presses a completion button 111, whereupon in response to a polling signal from the computer 207, the registers 204 and 225 transmit the data stored therein to the computer 207, which rewrites the balance of the customer's account. After the balance has been revised, the operation of the system proceeds in the same way as in the previously described case of withdrawal, until the card inserted in returned to the return slot 108. When the customer has taken out the card, the system is restored to the original condition.

If a cancel button 112 is pressed prior to pressing of the completion button 111, the card and bills that have been introduced into the slots 102 and 109 are returned to the customer through the slot 108.

It was assumed in the above description that the system was working as an online system. If it is desired to operate the system as an off-line system, a switch 226 is transferred from its contact *a* to *b*. Then, the data that were transmitted to the computer 207 in the online system are now transferred to a comparator 227, to which is connected a memory device 228 which stores those account numbers that have become invalid. When the account number that has been read from the card inserted into the slot 102 is transmitted to the comparator 227 through the transmission controller 208, the number is compared with all the invalid numbers stored in the memory system 228. If the account number read from the card is found invalid, the customer is so informed by indication in the window 103 and the card is collected into the machine as in the case of the online system.

In addition to the function of checking the account number, the comparator 227 also checks the term of availability of the card introduced into the machine and the number of times it has already been used.

In case the system operates as an off-line system, the input data are not sent to the computer 207, but they are recorded by the tape puncher 214 and/or the printer 215.

In the case of the online system, the imprinting and printing of the data on a slip is initiated by the completion signal produced by the computer when revision of the balance of the customer's account has been finished. In the case of the off-line system, the same operation is started by a completion signal produced by the tape puncher 214 and/or printer 215 upon completion of their operation.

What we claim is:

1. An automatic deposit-receiving and cash-dispensing system for use in banks and the like, comprising: data-reading means for reading an account number from a customer's identification card; means manually operable by a customer to enter a secret number into said system; means for comparing said read account number and said entered secret number to see if there is a predetermined relation between said compared numbers; means manually operable by said customer to enter into said system necessary data for withdrawal of cash from his account; means manually operable by said customer to designate whether a deposit or withdrawal is required; a cash-accepting means receiving cash to be deposited by said customer in his account, said cash accepting means temporarily storing the amount thereof as deposit data, cash-dispensing means for selectively delivering cash to said customer; a computer operable in response to recognition of said predetermined relation between said compared numbers to check said entered deposit or withdrawal data and said read account number against the customer's stored account number and account data, said computer being operative to rewrite said stored account data in accordance with said deposit or withdrawal data if valid, and to provide a control signal to enable said cash-dispensing means when a withdrawal is required, an indicator means for selectively displaying various instructions to said customer, and means controlling said indicator means so that the instruction being displayed corresponds to a desired operation of said system by said customer.

2. The system of claim 1, further including means for storing the account numbers of invalidated cards; a second comparing means for comparing said account number read from said card with said invalidated card account numbers; and means for connecting said reading means to said second comparing means and alternatively to said computer.

3. The system of claim 1, wherein said card has a portion of said data embossed thereon, and further including means for imprinting said embossed data on a slip; and means for printing on said slip said customer's account data.

4. The system of claim 3, wherein said slip is prepared in duplicate, and further including means for dispensing one copy of said slip to said customer and means for storing the other copy for record.

* * * * *